US012641662B2

(12) United States Patent
AlEryani et al.

(10) Patent No.: US 12,641,662 B2
(45) Date of Patent: May 26, 2026

(54) DETERMINING REJECT WAIT TIMES FOR RADIO RESOURCE CONTROL IDLE AND INACTIVE USER EQUIPMENT IN ADVANCED COMMUNICATION NETWORKS

(71) Applicant: Dell Products L.P., Round Rock, TX (US)

(72) Inventors: Yasser AlEryani, Kanata (CA); Vikas Arora, Ottawa (CA); Hemant Kumar Bhawarlal Jain, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 364 days.

(21) Appl. No.: 18/363,860

(22) Filed: Aug. 2, 2023

(65) Prior Publication Data

US 2025/0048468 A1 Feb. 6, 2025

(51) Int. Cl.
| | |
|---|---|
| *H04W 76/18* | (2018.01) |
| *H04L 67/1008* | (2022.01) |
| *H04W 24/08* | (2009.01) |
| *H04W 48/02* | (2009.01) |

(52) U.S. Cl.
CPC ......... *H04W 76/18* (2018.02); *H04L 67/1008* (2013.01); *H04W 24/08* (2013.01); *H04W 48/02* (2013.01)

(58) Field of Classification Search
CPC ..... H04W 76/18; H04W 24/08; H04W 48/02; G06F 9/50; H04L 7/1029; H04L 67/1008
See application file for complete search history.

(56) References Cited

U.S. PATENT DOCUMENTS

| | | | | |
|---|---|---|---|---|
| 2022/0095331 | A1* | 3/2022 | Laselva | H04W 76/27 |
| 2022/0394694 | A1* | 12/2022 | Vankayala | H04W 72/20 |
| 2023/0074220 | A1* | 3/2023 | Back | H04W 76/18 |
| 2023/0413265 | A1* | 12/2023 | Ramamurthy | H04W 72/1268 |
| 2024/0031429 | A1* | 1/2024 | Wu | G06F 9/50 |
| 2024/0056945 | A1* | 2/2024 | Hegde | H04W 48/02 |

OTHER PUBLICATIONS

3GPP, "5G;NR; Requirements for support of radio resource management," (3GPP TS 38.133 version 15.3.0 Release 15), Oct. 2018.
Al-Eryani, et al., "Self-Organizing mmWave MIMO Cell-Free Networks With Hybrid Beamforming: A Hierarchical DRL-Based Design," in IEEE Trans. on Commun., vol. 70, No. 5, pp. 3169-3185, May 2022.

* cited by examiner

*Primary Examiner* — Oussama Roudani
(74) *Attorney, Agent, or Firm* — Amin, Turocy & Watson, LLP

(57) ABSTRACT

The technology described herein is directed towards near-instantaneous optimization of radio resource control (RRC) rejection wait times per user equipment, which can be per user equipment of a group of multiple user equipment. In inference mode, a trained wait time prediction model (e.g., an artificial intelligence/deep reinforcement learning (AI/DRL) model in a base station) adaptively determines the per-UE rejection wait times based on current (measured) network state data, including current centralized unit and distributed unit utilization levels. The technology described herein operates to decreases the overall RRC request rate, while maintaining very high utilization of gNodeB resources, which results in increased per-UE energy efficiency and decreased signaling traffic loads.

20 Claims, 11 Drawing Sheets

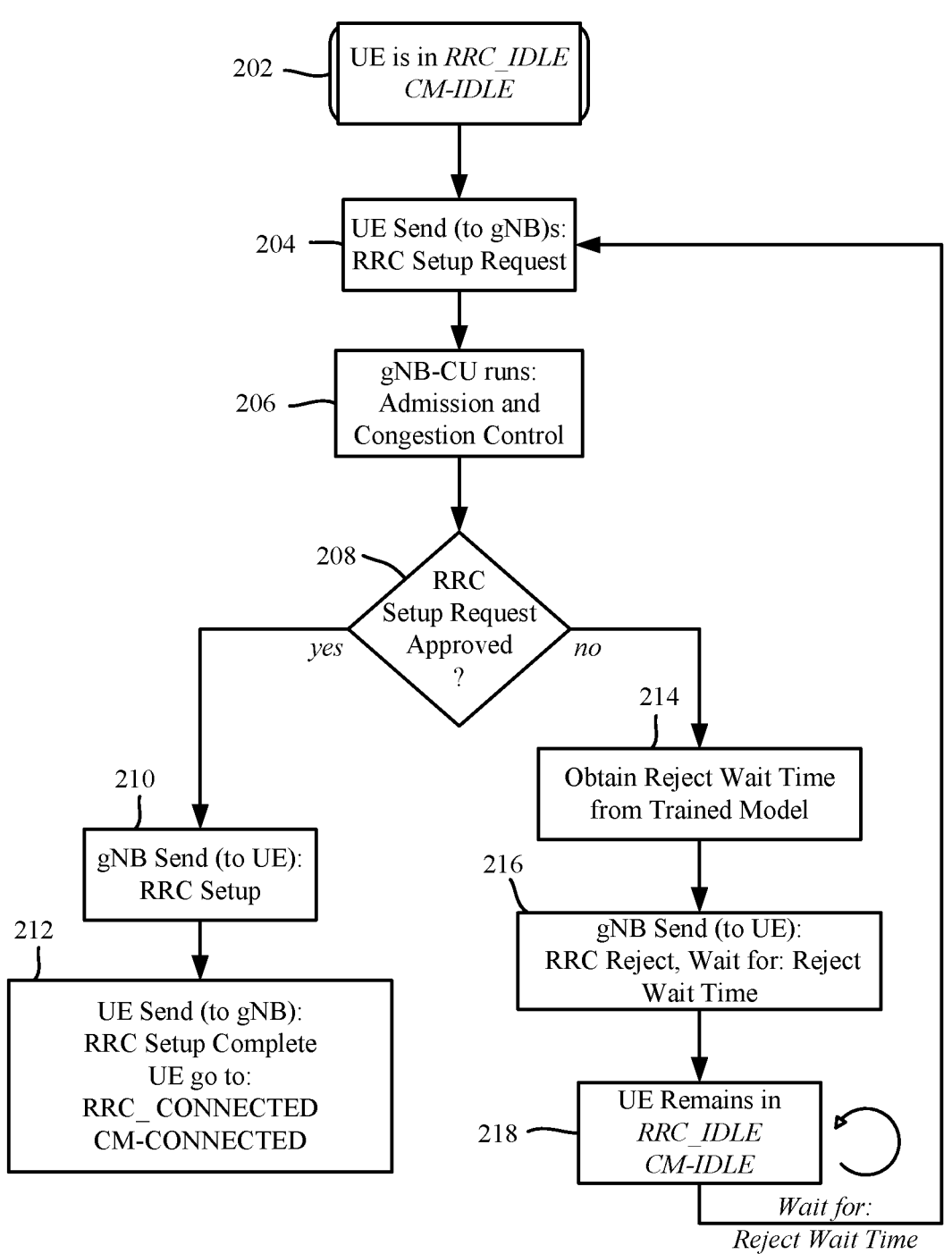

202 UE is in *RRC_IDLE*
*CM-IDLE*

204 UE Send (to gNB)s:
RRC Setup Request 206 gNB-CU runs:
Admission and
Congestion Control 208 RRC
Setup Request
Approved
?

*yes*          *no*

210 gNB Send (to UE):
RRC Setup

212 UE Send (to gNB):
RRC Setup Complete
UE go to:
RRC_ CONNECTED
CM-CONNECTED

214 Obtain Reject Wait Time
from Trained Model 216 gNB Send (to UE):
RRC Reject, Wait for: Reject
Wait Time 218 UE Remains in
*RRC_IDLE*
*CM-IDLE*

*Wait for:*
*Reject Wait Time*

FIG. 2

| Environment Variables | System Equivalent |
|---|---|
| State $S = \{s_1,..., s_{(N+2)}\}$ | $\{$instCuCpLoad,instcuUp1AvgLoad,...,instCuUpNLoad,instDuLoad$\}$ |
| Reward $r$ | $f($avgPerUeWaitTime, avgPerUeRrcSetupReqRate, avgPerUeRrcResumeReqRate, avggNbLoad$)$ |
| Action $a$ | $T_{wait} = \{t_1,..., t_k\}$ |
| $K$ | Maximum number of requesting UEs a certain gNB can handle at any time |
| $N$ | Maximum number of CU-UPs a certain gNB can support |
| $t_k$, $k = 1,..., K$ | The Reject Wait Time Data assigned for the $k^{th}$ requesting UE where $t_k \in \{1,..., 16\}$ Seconds. |

FIG. 4

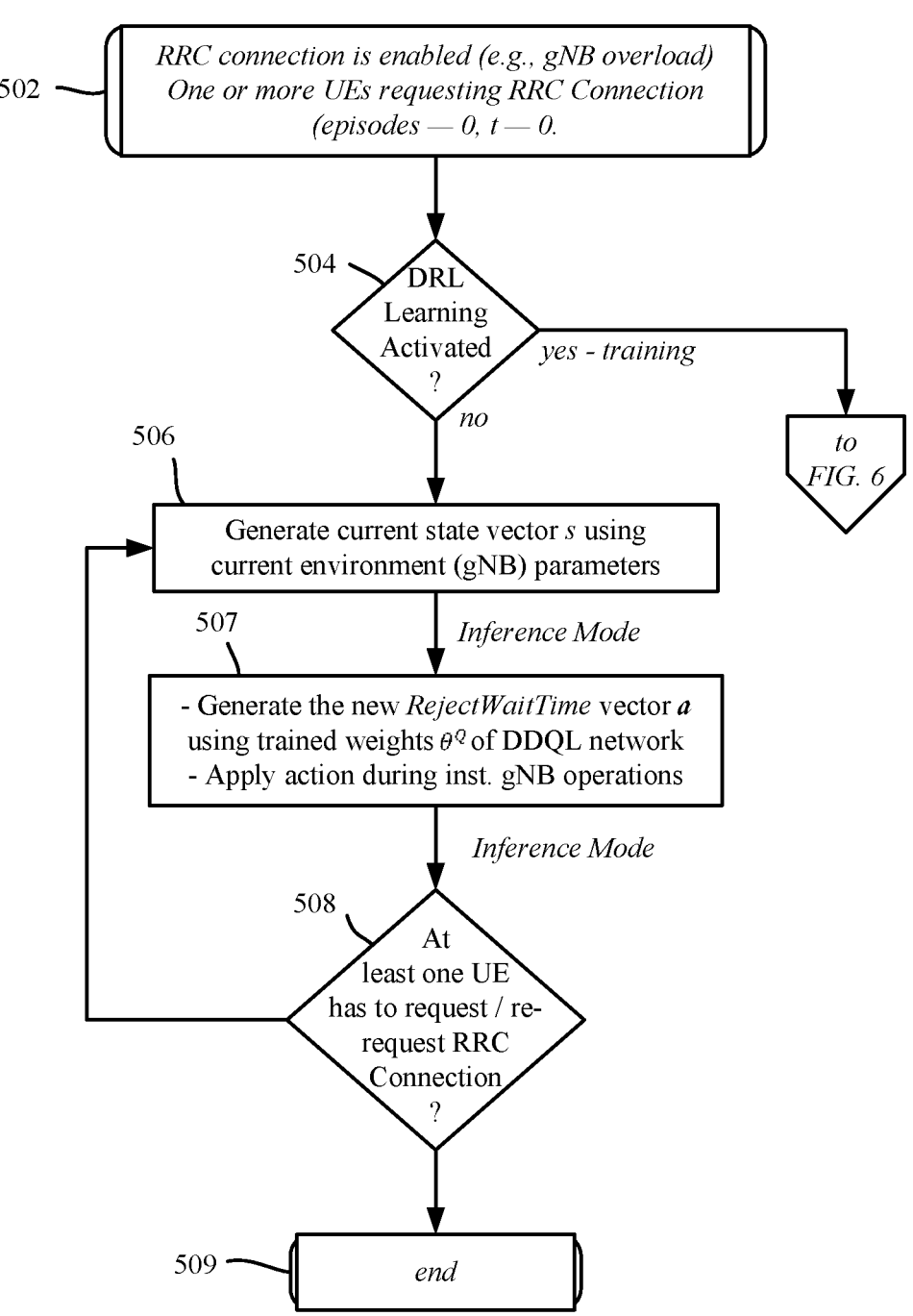

502 — RRC connection is enabled (e.g., gNB overload)
One or more UEs requesting RRC Connection
(episodes — 0, t — 0.

504 — DRL Learning Activated ?

yes - training to FIG. 6 no

506 — Generate current state vector *s* using current environment (gNB) parameters

*Inference Mode*

507 — - Generate the new *RejectWaitTime* vector a using trained weights $\theta^Q$ of DDQL network
- Apply action during inst. gNB operations

*Inference Mode*

508 — At least one UE has to request / re-request RRC Connection ?

509 — end

FIG. 5

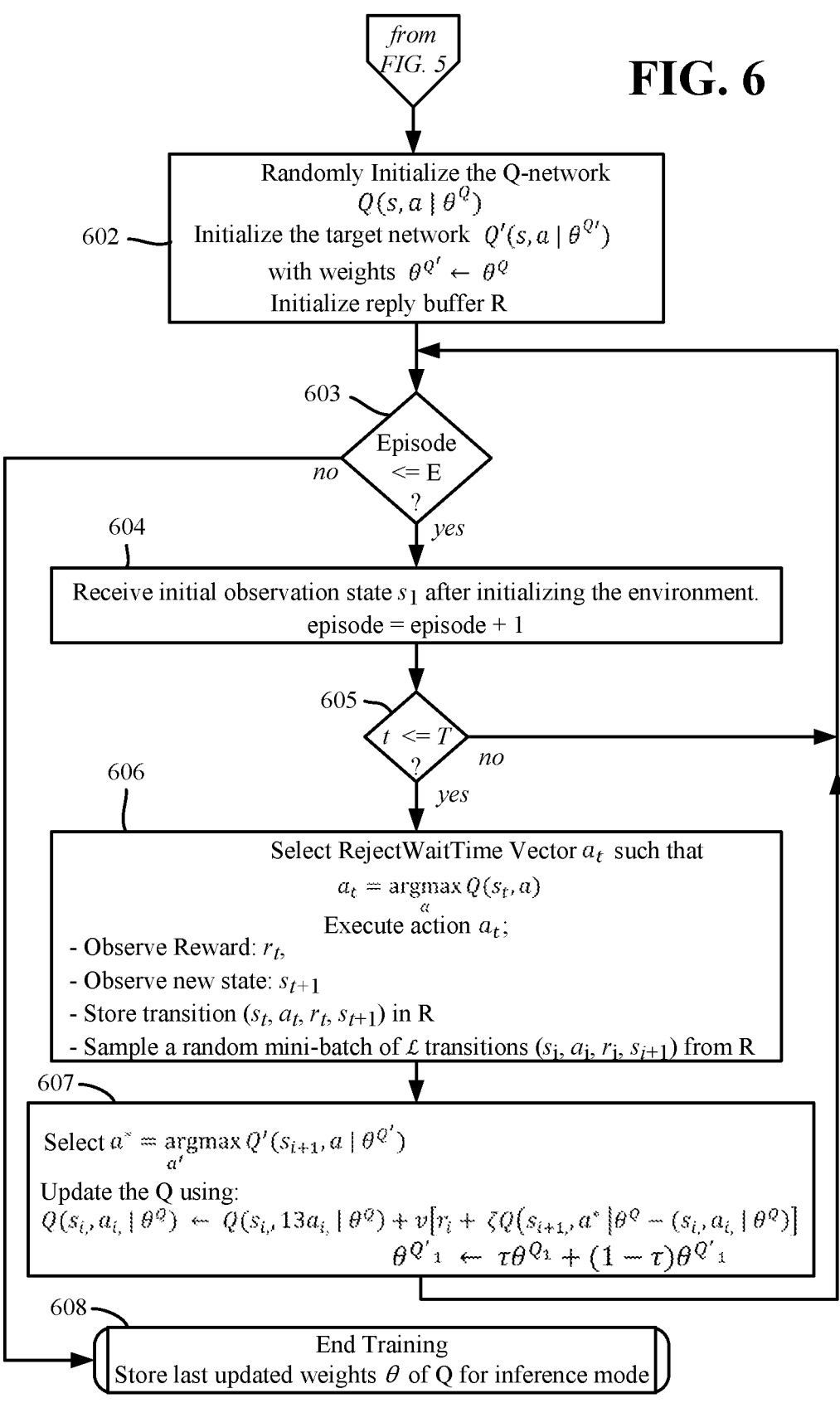

FIG. 6 from FIG. 5

602 — Randomly Initialize the Q-network
$Q(s, a \mid \theta^Q)$
Initialize the target network $Q'(s, a \mid \theta^{Q'})$
with weights $\theta^{Q'} \leftarrow \theta^Q$
Initialize reply buffer R 603 — Episode $\leq E$ ? — no / yes 604 — Receive initial observation state $s_1$ after initializing the environment.
episode = episode + 1

605 — $t \leq T$ ? — no / yes

606 — Select RejectWaitTime Vector $a_t$ such that
$a_t = \operatorname*{argmax}_a Q(s_t, a)$
Execute action $a_t$;
- Observe Reward: $r_t$,
- Observe new state: $s_{t+1}$
- Store transition $(s_t, a_t, r_t, s_{t+1})$ in R
- Sample a random mini-batch of $\mathcal{L}$ transitions $(s_i, a_i, r_i, s_{i+1})$ from R 607 — Select $a^* = \operatorname*{argmax}_{a'} Q'(s_{i+1}, a \mid \theta^{Q'})$
Update the Q using:
$Q(s_i, a_i \mid \theta^Q) \leftarrow Q(s_i, 13a_i \mid \theta^Q) + v[r_i + \zeta Q(s_{i+1}, a^* \mid \theta^Q - (s_i, a_i \mid \theta^Q)]$
$\theta^{Q'}{}_1 \leftarrow \tau \theta^{Q_1} + (1 - \tau)\theta^{Q'}{}_1$ 608 — End Training
Store last updated weights $\theta$ of Q for inference mode

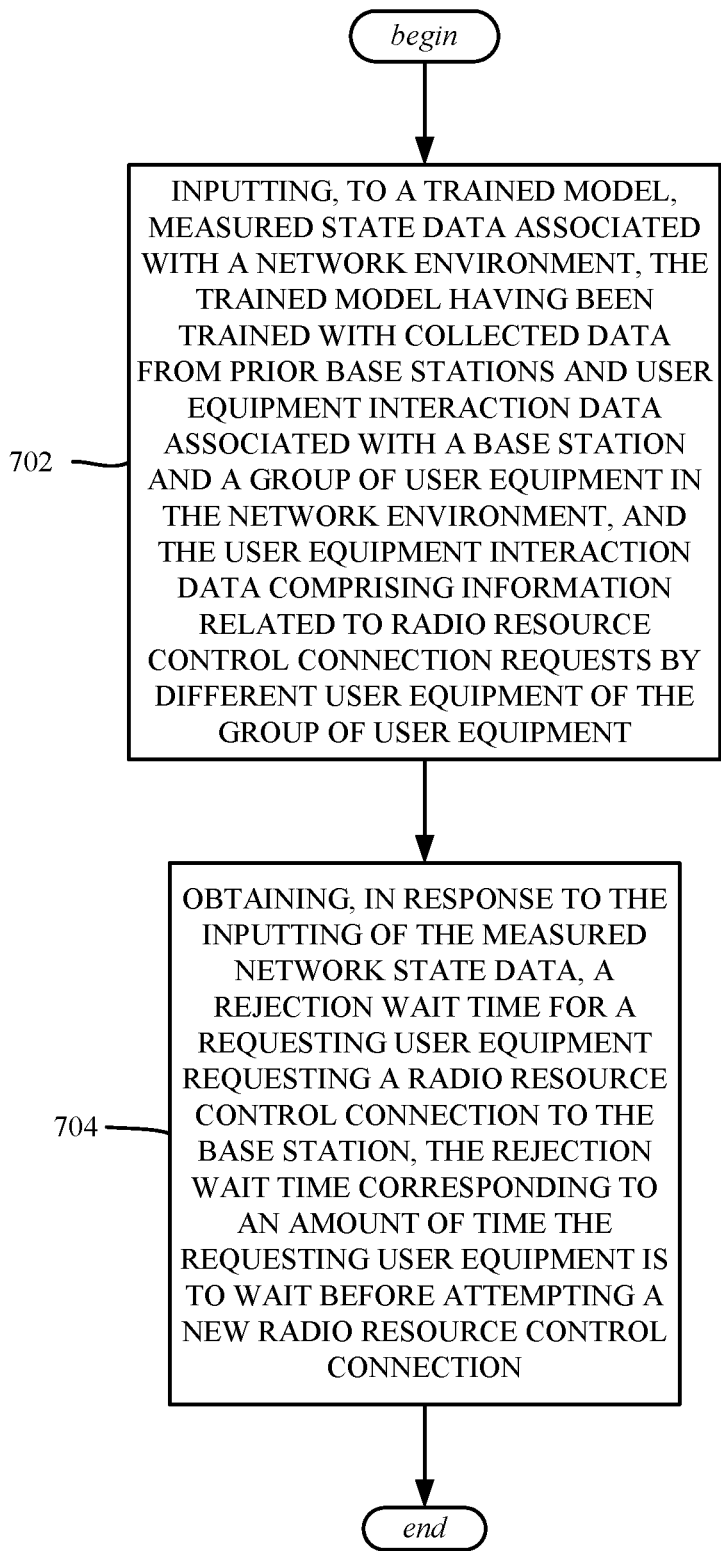

begin

702 —

INPUTTING, TO A TRAINED MODEL, MEASURED STATE DATA ASSOCIATED WITH A NETWORK ENVIRONMENT, THE TRAINED MODEL HAVING BEEN TRAINED WITH COLLECTED DATA FROM PRIOR BASE STATIONS AND USER EQUIPMENT INTERACTION DATA ASSOCIATED WITH A BASE STATION AND A GROUP OF USER EQUIPMENT IN THE NETWORK ENVIRONMENT, AND THE USER EQUIPMENT INTERACTION DATA COMPRISING INFORMATION RELATED TO RADIO RESOURCE CONTROL CONNECTION REQUESTS BY DIFFERENT USER EQUIPMENT OF THE GROUP OF USER EQUIPMENT

704 —

OBTAINING, IN RESPONSE TO THE INPUTTING OF THE MEASURED NETWORK STATE DATA, A REJECTION WAIT TIME FOR A REQUESTING USER EQUIPMENT REQUESTING A RADIO RESOURCE CONTROL CONNECTION TO THE BASE STATION, THE REJECTION WAIT TIME CORRESPONDING TO AN AMOUNT OF TIME THE REQUESTING USER EQUIPMENT IS TO WAIT BEFORE ATTEMPTING A NEW RADIO RESOURCE CONTROL CONNECTION end

FIG. 7

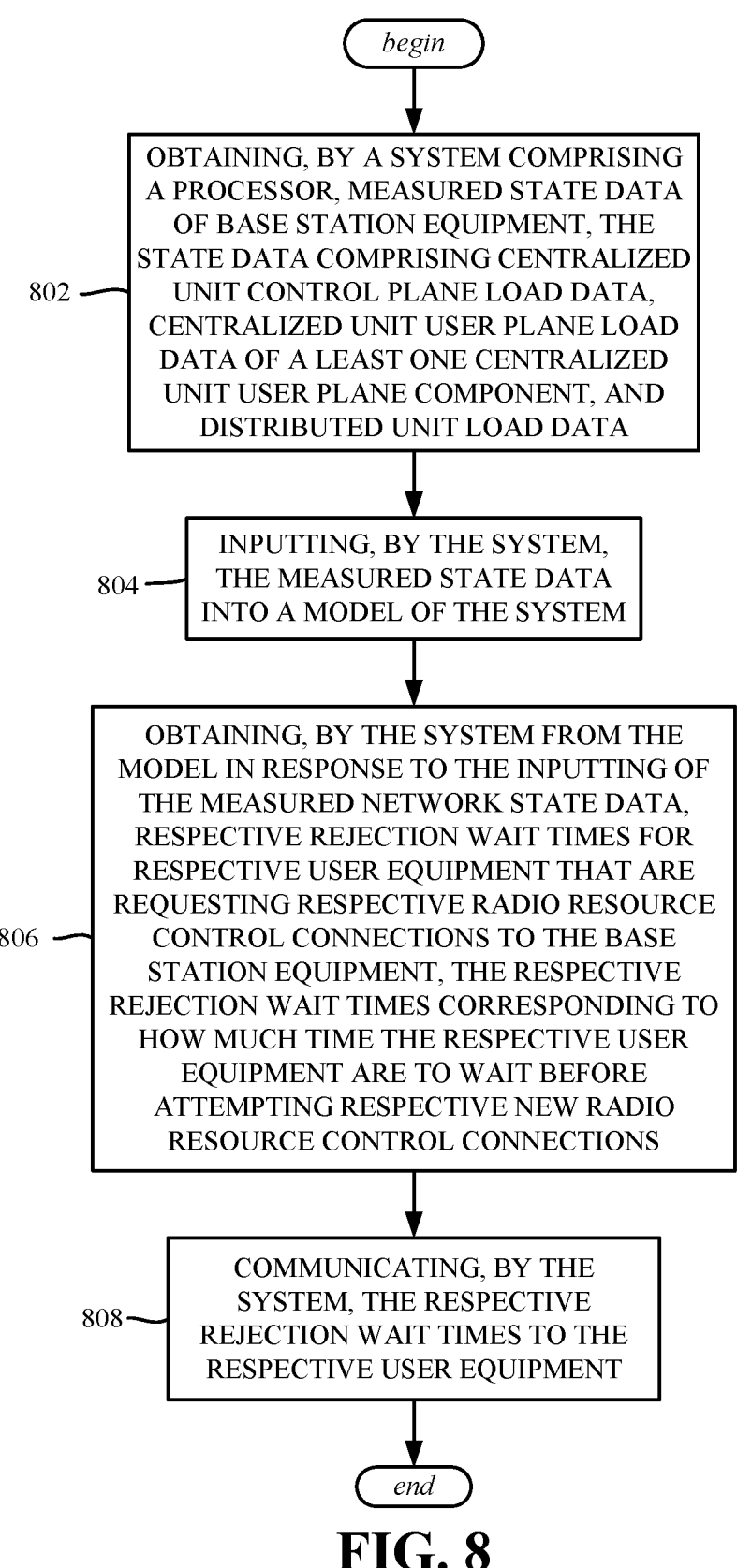

begin

802 — OBTAINING, BY A SYSTEM COMPRISING A PROCESSOR, MEASURED STATE DATA OF BASE STATION EQUIPMENT, THE STATE DATA COMPRISING CENTRALIZED UNIT CONTROL PLANE LOAD DATA, CENTRALIZED UNIT USER PLANE LOAD DATA OF A LEAST ONE CENTRALIZED UNIT USER PLANE COMPONENT, AND DISTRIBUTED UNIT LOAD DATA

804 — INPUTTING, BY THE SYSTEM, THE MEASURED STATE DATA INTO A MODEL OF THE SYSTEM

806 — OBTAINING, BY THE SYSTEM FROM THE MODEL IN RESPONSE TO THE INPUTTING OF THE MEASURED NETWORK STATE DATA, RESPECTIVE REJECTION WAIT TIMES FOR RESPECTIVE USER EQUIPMENT THAT ARE REQUESTING RESPECTIVE RADIO RESOURCE CONTROL CONNECTIONS TO THE BASE STATION EQUIPMENT, THE RESPECTIVE REJECTION WAIT TIMES CORRESPONDING TO HOW MUCH TIME THE RESPECTIVE USER EQUIPMENT ARE TO WAIT BEFORE ATTEMPTING RESPECTIVE NEW RADIO RESOURCE CONTROL CONNECTIONS

808 — COMMUNICATING, BY THE SYSTEM, THE RESPECTIVE REJECTION WAIT TIMES TO THE RESPECTIVE USER EQUIPMENT end

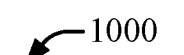
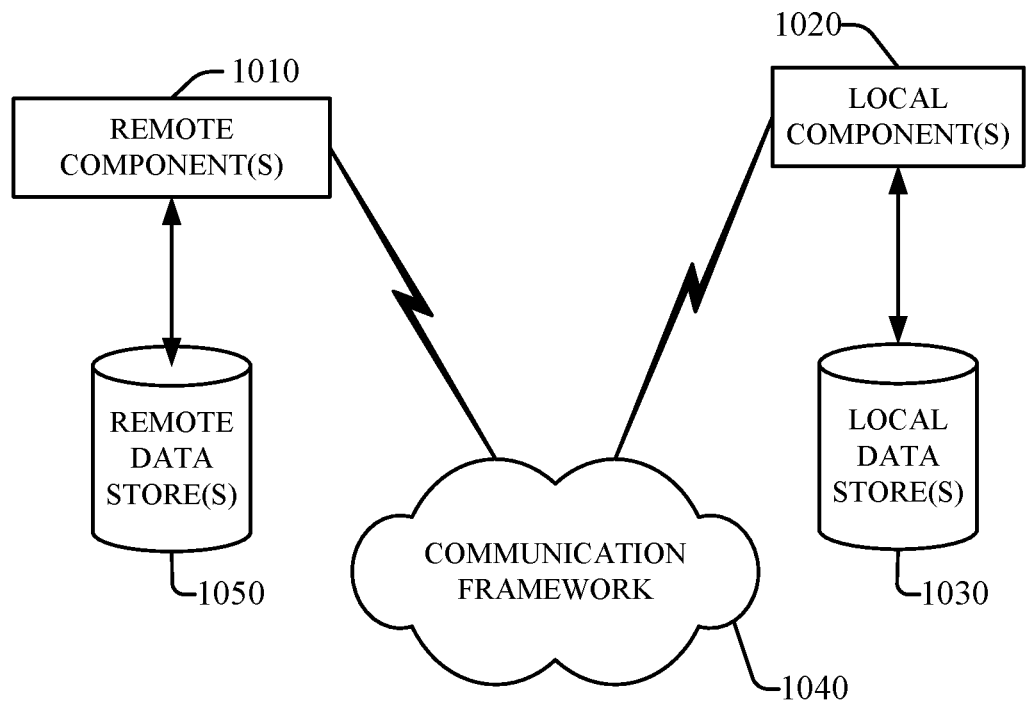
FIG. 10

DETERMINING REJECT WAIT TIMES FOR RADIO RESOURCE CONTROL IDLE AND INACTIVE USER EQUIPMENT IN ADVANCED COMMUNICATION NETWORKS

BACKGROUND

In communication networks, radio resource control (RRC) connection failures happen as a result of two main causes, namely "No Response" from the user equipment (UE) side, or a gNodeB (gNB) connection rejection due to overload/congestion events, caused by a lack of resources. With the recent emergence of massive machine-type communications (mMTC) and ultra-reliable low latency communications (URLLC), a huge amount of UEs per unit area will need to be simultaneously granted access to network resources, with excellent reliability and very short latency. This will have a direct impact on the amount of UE-initiated RRC connection requests, and hence on the rate of RRC connection failures caused by gNB connection rejections.

BRIEF DESCRIPTION OF THE DRAWINGS

The technology described herein is illustrated by way of example and not limited in the accompanying figures in which like reference numerals indicate similar elements and in which:

FIG. 2 is a flow diagram showing example operations related to obtaining a reject wait time from a trained model when a radio resource control (RRC) setup request is not approved, in accordance with various aspects and implementations of the subject disclosure.

FIG. 4 is a summary representation of related to deep reinforcement learning information including parameters used in the reject wait time optimization model, in accordance with various aspects and implementations of the subject disclosure, in accordance with various aspects and implementations of the subject disclosure.

FIGS. 5 and 6 comprise a flow diagram of example operations related to learning and inference modes of a deep reinforcement learning model, in accordance with various aspects and implementations of the subject disclosure.

FIG. 7 is a flow diagram showing example operations related to obtaining a rejection wait time for a requesting user equipment based on inputting the measured network state data, in accordance with various aspects and implementations of the subject disclosure.

FIG. 8 is a flow diagram showing example operations related to obtaining respective rejection wait times for respective requesting user equipment based on measured state data, in accordance with various aspects and implementations of the subject disclosure.

FIG. 10 is a block diagram representing an example computing environment into which aspects of the subject matter described herein may be incorporated.

DETAILED DESCRIPTION

Various aspects of the technology described herein are generally directed towards near-instantaneous optimization of radio resource control (RRC) rejection wait times per user equipment. A wait time prediction model (e.g., an artificial intelligence/deep reinforcement learning (AI/DRL) model) adaptively determines rejection wait times based on current (measured) network state data. The technology described herein operates to decreases the overall RRC request rate, while maintaining very high (e.g., up to maximum) utilization of gNodeB resources. The result is increased per-UE energy efficiency and decreased signaling traffic loads.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal" and the like only represent objectives to move towards a more optimal state, rather than necessarily obtaining ideal results. For example, "optimal" can refer to a time value that is based on the data that is available (e.g., the current conditions of the network and/or user equipment), rather than necessarily achieving a fully optimal time value result. Similarly, "maximize" means moving towards a maximal state (e.g., up to some threshold or practical limit, if any), rather than necessarily achieving such a state.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
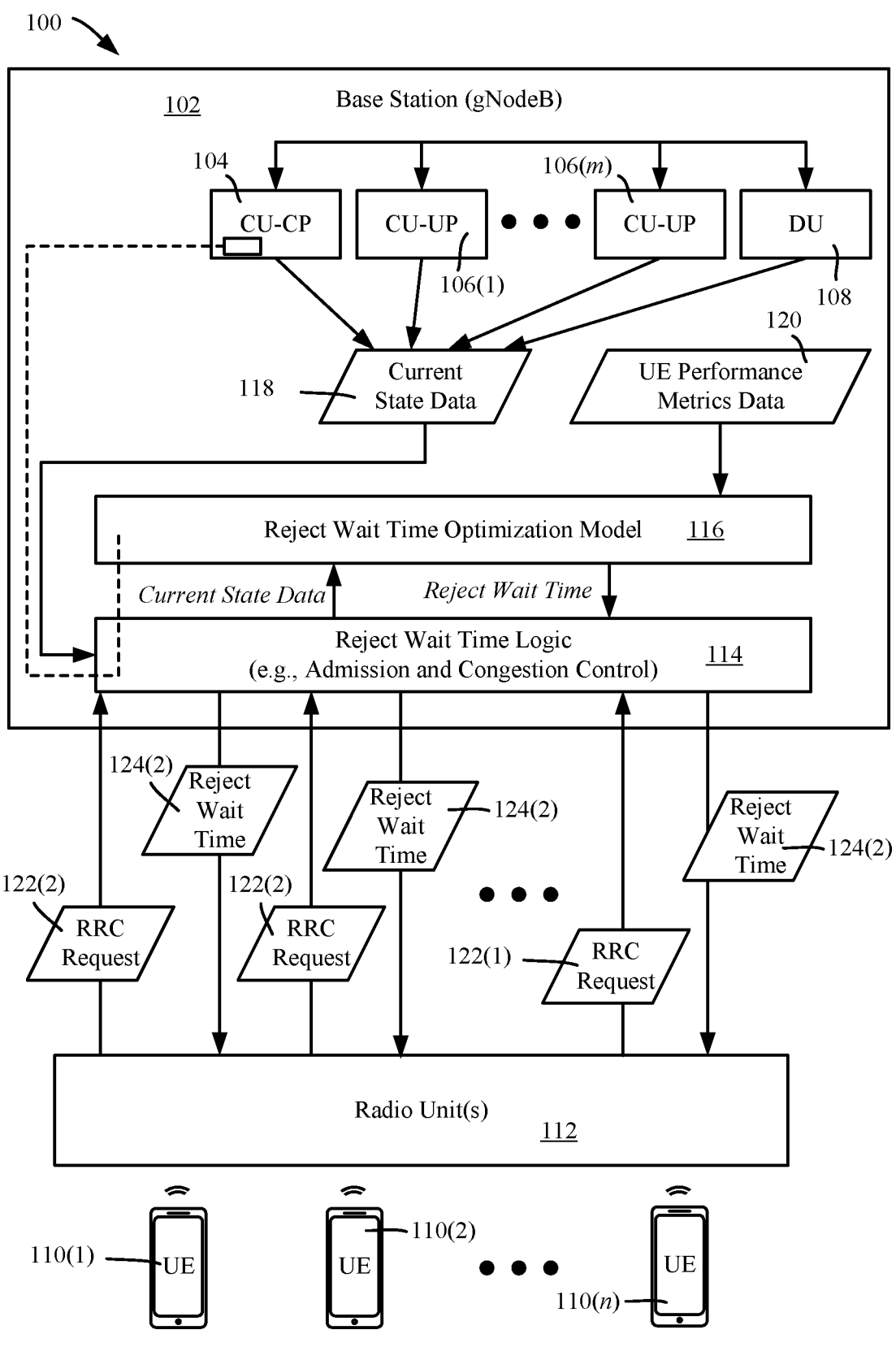
FIG. 1 depicts an example representation of a system/architecture including a base station configured to determine reject wait times for user equipment, in accordance with various aspects and implementations of the subject disclosure.

FIG. 1 is an example representation of an example system/architecture 100 including a base station 102 (alternatively referred to as a gNodeB herein for existing advanced networks, but adaptable to future advanced networks). The example base station 102 includes a centralized unit control plane (CU-CP) component 104, one or more centralized unit user plane (CU-UP) components 106(1)-106(m), and a distributed unit 108. The one or more centralized unit user plane (CU-UP) component(s) can be labeled 106.

To determine reject wait times for user equipment (UEs) 110(1)-110(n), to which the base station 102 communicates via radio unit(s) 112, the base station 102 includes or is coupled to reject wait time logic 114 and a trained reject wait time optimization model 116 as described herein. As represented by the dashed line, one or both of the reject wait time logic 114 and/or the trained reject wait time optimization model 116 can be coupled to or incorporated into the centralized unit, e.g., the control plane component 104 or one (or more) of the centralized unit user plane (CU-UP) components 106(1)-106(*m*). For example, the centralized unit performs admission and congestion control functionality, into which the logic 114 and/or model 116 can be incorporated.

As described herein, the reject wait time optimization model 116 inputs state data 118 corresponding to the current state of the network, and can also input UE performance metrics data 120. The state data 118 includes, but is not limited to, near-instantaneous utilization data of the centralized unit control plane component 104, near-instantaneous utilization data of the centralized unit user plane component(s) 106, and near-instantaneous utilization data of the distributed unit component 108.

As represented in FIG. 1, the UEs 110(1)-110(*n*) make RRC requests 122(1)-122(*n*), respectively. In the event that that base station 102 is heavily loaded, the reject wait time logic 114 and the trained reject wait time optimization model 116 work together to return respective rejection wait time values 124(1)-124(*n*) to the UEs 110(1)-110(*n*) as in this example. As described herein, the respective rejection wait times, which need not be the same, are optimized by the model 116.

FIG. 2 shows example operations related to the logic, beginning at operation 202 where a UE is in an RRC_IDLE/CM-IDLE state; note that transitioning from an inactive state (via an RRCResume Request message) is not described separately herein for purposes of brevity. At some point, the UE sends an RRC setup request (an RRCSetupRequest message) as represented by operation 204. When received, the gNB-CU runs admission and congestion control to determine if the RRC setup request is approved, as represented by operations 206 and 208.

If approved at operation 208, the gNB sends an RRC setup response (an RRCSetup message) to the UE, as represented by operation 210, along with related information. At operation 212 the UE sends back to the gNB an RRC setup complete (RRCSetupComplete) message and the UE transitions to the RRC_CONNECTED/CM-CONNECTED state.

If the RRC setup request is not approved at operation 208, the gNB instead obtains a reject wait time from the model at operation 214, and returns the time parameter value with an RRC reject response (an RRCReject message with a Reject-WaitTime value) at operation 216. When this message is received, as represented by operation 218 the UE remains in the RRC_IDLE/CM-IDLE state, waits for the reject wait time, and then returns to operation 204 to again send an RRC setup request. Note that if the setup request is again not approved at operation 208, a different reject wait time can be determined and returned via operations 214 and 216.

Thus, the reject wait time (RejectWaitTime) is the wait time that defines how many seconds the UE is to wait after reception of an RRC reject response (RRCReject message) until a new RRC setup message is to be sent. This time parameter value ($\in\{1, \ldots, 16\}$ Seconds) is included within the RRC connection reject message (with no rejection reason declaration). A proper reject wait time has a direct impact on reducing the average per-UE wait time as well as reducing the amount of signaling requests, and as described herein, the model operates to determine such a proper reject wait time.

Described herein is an inference model that tries to adapt the UE waiting time based on several system parameters (e.g., number of queue UEs, fairness, and so forth).

To quantify the effect of adjusting reject wait time for requesting user equipment on the network performance, the following table shows a set of potential performance metrics (loggings) that can be used to optimize the selection of reject wait time for each requesting UE:

| Metric | Description | Impact of Reject Wait Time |
|---|---|---|
| PerUEAverageWaitTime | The average time a certain UE had to wait from the moment of first RRCResumRequest (in RRC_INACTIVE) or RRCSetupRequest (in RRC_IDLE) to the moment of connection approval. In other words, this can be considered as the interval from the time a UE sends its first RACH (random access channel) preamble until the UE is connected to the network. The measurement is incremented each time a UEInformationResponse-r16 message containing a RA-ReportList-r16 IE is received. This performance can be measured through RACH.AccessDelayDist.Bin, where Bin is to identify the bins associated with the RACH access delay. | Overestimated reject wait time increases the average per-UE wait time. |
| PerUEAverageRequestRate | The average number of times a certain UE had to request RRCResumeRequest (in RRC_INACTIVE) or RRCSetupRequest (in RRC_IDLE) before being approved to connect. | Underestimated reject wait time increases the per-UE average request rate. |
| UtilizationOfgNBResources | Represents the average long-term utilization of resources of gNB entities (CU-CP, CU-UP, and DU). This can be represented as a weighted sum of the load percentage of these entities. | Shorter reject wait time will allow UEs connect faster gNB resources are available and hence, increases the average utilization percentage. |

Dynamic adaptation of reject wait times as described herein, including in which a different reject wait time can be returned for each requesting UE, can be based on some or all circumstances, including, but not limited to UE request order, current gNB utilization and category of the UE. As will be understood, the value of a reject wait time is sensitive to current status of the CU/DU. RACH traffic prediction is provided as a capability that plays a significant major role in the assignment of a reject wait time. For example, the model can adapt a reject wait time based on the number of requesting UEs and the CU/DU utilization during a previous period of time (a configurable design parameter), and decide accordingly for how long a certain requesting UE is to wait before attempting a new RRC setup request/RRC resume request. This capability of understanding the traffic behavior as a function of time has a significant impact on the optimization of reject wait time under the massive machine-type communications (mMTC) paradigm.

In one example implementation described herein, the utilization of AI/ML in the online operations of random access operations is achieved through the utilization of deep reinforcement learning (DRL) techniques that interact with the gNB-CU-CP (environment) to produce a reward that is a function of different performance metrics (set forth in the above table) and then take an optimized decision that assigns a certain reject wait time value for each requesting UE (e.g., as in FIG. 2). The environment states of the proposed DRL model described herein includes the number of attempts each requesting UE has made trying to connect. Optimization also can be based on other performance metrics, including, but not limited to as UE energy consumption, RACH signaling load, traffic signaling, and average per UE wait time for assigning the reject wait time.

The concept of reinforcement learning (RL) refers to the learning process of an agent interacting with its environment after receiving certain observations. The environment provides a reward to the agent for every interaction, and the RL agent aims to select the right action for the next interaction in order to maximize the discounted reward over a time horizon.

This problem can be formulated as a Markov decision process (MDP) in which an MDP is a tuple (S,A,P,R,$\zeta$), where S represents a K-dimensional state vector (with each state at time t denoted by $s_t$), A is the action space that contains a finite set of actions from which the agent can choose, P:S×A×S→[0, 1] is a transition probability in which P(s,$\alpha$,s') defines the probability of observing state s' after executing action $\alpha$ in the state s, R: S×A→R is the expected reward after being in state s and taking action $\alpha$, and $\zeta \in$ [0, 1) is the discount factor. To solve the MDP, RL algorithms have been developed to learn and find a discrete value function or a "policy". Such discretization can lead to lack of generalization and significantly increase the problem dimensionality; therefore, DRL algorithms based on function approximation by deep neural networks (DNNs) can be used. DRL algorithms can be classified into three types: (i) value-based methods such as deep Q-learning (DQL) and SARSA which only learn the so-called value function to find a policy, (ii) policy-based methods which learn the policy directly by following the gradient with respect to the policy, and (iii) actor-critic methods which are a hybrid of the value-based for the critic and policy-based methods for the actor. A standard DQL method is described herein. For an agent with parameters $\theta^Q$ at time t, after the agent takes an action in state $s_t$ and observes the immediate reward $r_t$+1 with the resulting state $s_t$+1, the DQL weight update equation (1) is:

$$Q(s, a \mid \theta^Q_{t+1}) =$$

$$Q(s, a' \mid \theta^Q_t) + v \left[ r_{t+1} + \zeta \max_{a'} Q(s_{t+1}, a' \mid \theta^Q_t) - Q(s_t, a_t \mid \theta^Q_t) \right] = Q(s, a \mid \theta^Q_t) +$$

$$v \left[ r_{t+1} + \zeta \max_{a'} Q\left(s_{t+1}, \operatorname*{argmax}_{a'} Q(s_t + 1, a' \mid \theta^Q_t) \mid \theta^Q_t \right) - Q(s_t, a_t \mid \theta^Q_t) \right],$$

were v is the rate of learning. Computing the term $$\operatorname*{argmax}_{a'} Q(s_t + 1, a' \mid \theta^Q_t) \mid \theta^Q_t)$$

introduces a systematic overestimation of the Q-values during the learning that is accentuated using bootstrapping, i.e., learning estimates from estimates. The Q-learning update in the above equation (1) uses the same Q-network $$Q(s, a \mid \theta^Q_t)$$

both to select and to evaluate an action. The action selection and evaluation can be decoupled by introducing two deep Q-networks, a Q network and a target network Q' with different parameters $\theta^Q$ and $\theta^{Q'}$, respectively, to avoid maximization bias. The Q' network is used for action selection while the Q network is used for action evaluation. This is known as a deep double Q-learning algorithm (DDQL); the DDQL update equation (2) can be expressed as:

$$Q(s, a \mid \theta^Q_{t+1}) = Q(s, a \mid \theta^Q_t) + \tag{2}$$

$$v \left[ r_{t+1} + \zeta \max_{a'} Q\left(s_{t+1}, \operatorname*{argmax}_{a'} Q\left(s_{t+1}, a' \mid \theta^{Q'}_t \right) \mid \theta^Q_t \right) - Q(s_t, a_t \mid \theta^Q_t) \right].$$

The parameters $\theta^{Q'}$ of the Q' network periodically hard-copy the parameters $\theta^Q$ of Q network after to time steps using the Polyak averaging method with parameter $$\tau \in [0, 1]: \theta_{Q_{t+t_0}} = (1 - \tau) \theta^{Q'}_t + \tau \theta^Q_t.$$

By modeling the problem through as a Markov decision process, a DRL agent may be approximated by deep neural networks (that train by updating the network weights to produce the best decision policy, resulting in a deep reinforcement learning (DRL) prediction system. Once trained, DRL system is able to produce optimized values of a real life application system such that a certain reward is maximized. While training the DRL agent may take relatively long time (Bellman Equation), the trained agent can produce optimized solution at microsecond levels (a relatively near-instantaneous inference time). In general, the technology described herein can use a DRL system to predict the long term behavior of gNB load (CU-CP and the connected CU-UPs) and then produce an optimized reject wait time values for any RRC_IDLE (or RRC_INACTIVE) UEs that are requesting an RRC Connection.

In one implementation, a DRL system for per-UE reject wait time optimization (near-instantaneously) optimizes the per-UE reject wait times for UEs in the RRC_IDLE and RRC_INACTIVE states. The design is based on maximizing a discounted reward that represents a combination of tradeoff performance metrics (e.g., in the above Table) given the current utilization of different gNB entities (i.e., CU-CP, CU-UP, and DU).

DRL modeling monitors gNB real time operations which are considered the environment of the DRL system. The following gNB periodically captured measurements are taken as the state vector for the DRL system:

I. instCuCpLoad: This represents the instantaneous utilization (in percent) of the CU-CP, which is taken as a weighted sum of memory and CPU utilization.

II. instCuUpLoadi, =1, . . . , N: This represents the instantaneous utilization of the: This represents the instantaneous utilization of the ith-CU-UP connected to the CU-CP. The constant N represents the number of all CU-UPs connected to a single CU-CP.

III. instDuLoad: This represents the instantaneous utilization (in percent) of the DU.

The reward of the DRL system is considered a weighted sum of the following (targeted enhancements):

I. avgPerUeWaitTime: This represent the long term average wait time of a certain UE spend from the moment of its first RRC connection request to the moment of RRC connection approval.

II. avgPerUeRrcSetupReqRate: This represents the average amount of request and re-requests a certain RRC_IDLE UE takes from the moment of its first RRC connection request to the moment of RRC connection approval.

III. avgPerUeRrcResumeReqRate: This represents the average amount of request and re-requests a certain RRC_INACTIVE UE takes from the moment of its first RRC connection request to the moment of RRC connection approval.

IV. avggNbLoad: This represents the overall load of gNB including the CU-CP, CU-UPs, and the DU.

The agent action is a K×1 vector, where K is the maximum number of RRC Connection Requests gNB can handle at a time.

Figure 3:
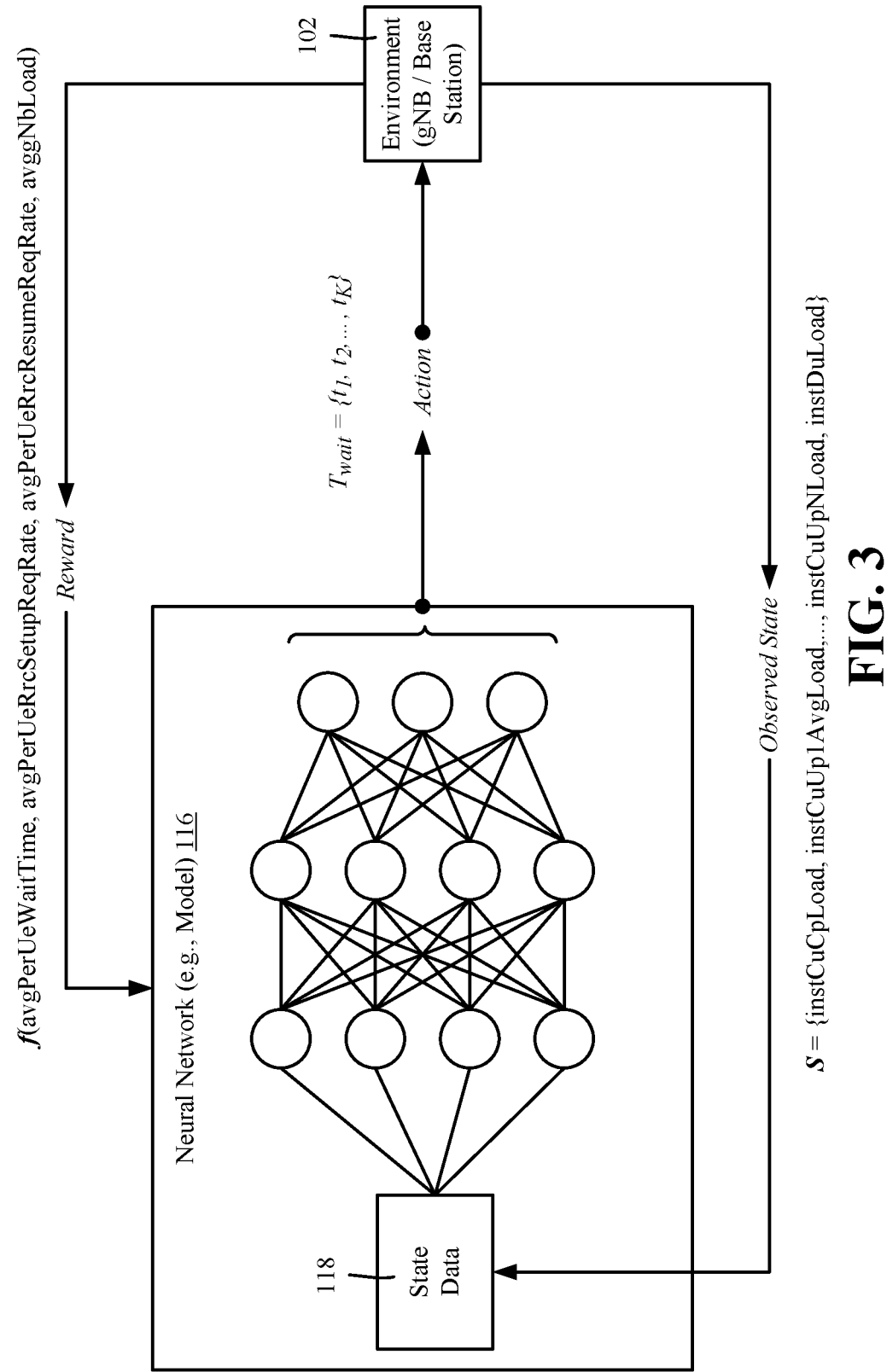
FIG. 3 is a representation of an example model that determines a reject wait time based on current state data, in accordance with various aspects and implementations of the subject disclosure, in accordance with various aspects and implementations of the subject disclosure.

FIG. 3 is a schematic block diagram of the example system. To find the wait vector $T_{wait}$ for a maximum of K requesting UEs (both in RRC_IDLE and RRC_INACTIVE), the DDQL that accepts the current accumulated average load of different gNB entities as environment state vector is selected. To further illustrate, FIG. 4 summarizes one example environment design, by specifying the parameters used in this model.

The selection of state vectors is conducted such that the agent learns the statistics of load utilization of the elements participating in serving different UEs (i.e., CU-CP, CU-UP(s), and DU). This system can be also upgraded to achieve load balancing among different CU-UPs; this can be implemented by including the variance of average load of different CU-UPs into the reward calculation function.

A proper design of the reward function $f(\cdot)$ has a direct impact on what performance metric gives higher prioritization during the maximization process. As one example, consider the following reward function:

$$r = c_1\,(avgPerUeWaitTime) + c_2\,(avgPerUeRrcSetupReqRate) + \\ c_3\,(avgPerUeRrcResumeReqRate) + c_4\,avggNbLoad,$$

$$\text{where,}$$

$$c_1 + c_2 + c_3 + c_4 = 1$$

$$\text{and}$$

$$0 \le c_i \le 1,$$

$$i = 1, \dots , 4.$$

More priority can be given to UEs in the RRC_INAC-TIVE mode over those in the RRC_INACTIVE mode RRC_IDLE by setting $c_2 < c_3$. This may have an impact in reducing connection establishment signaling overhead, as the UE contexts of RRC_INACTIVE UEs are already stored (i.e., at CM_CONNECTED). As can be appreciated, the converse can be performed, that is, the RRC_IDLE mode can have priority over the RRC_INACTIVE mode by setting $c_3 < c_2$. For low-energy consumption applications, the UE's wait time can be achieved by setting $c_2$ and $c_3$ to some smaller value(s), even at the expense of increased average wait time (relatively high $c_1$ values). For URLLC applications, the value of $c_1$ may be minimized or reduced to some desirable value. For fuller utilization of resources, the value of $c_4$ maybe given higher weight. For even tradeoff among the design targets, $c_1 = c_2 = c_3 = c_4 = 0.25$.

An example flow diagram of one system implementation is shown in FIGS. 5 and 6. Via operation 504 the system operates in inference mode (FIG. 5, operations 506-509), or training mode FIG. 6, operations 602-608. During inference mode, training has been completed and no weight update needs to take place; in the inference mode the time required to get an optimized value of RejectWaitTime is significantly small (on the order of microseconds). As can be seen, via operation 508 of FIG. 5, inference continues until no UE needs to request or re-request an RRC connection.

In the training mode of FIG. 6, the system is put into an action with real-time testing scenarios. The weights of the agent neural network are updated at each time step of each episode (training iteration). The time spent on training the proposed system can be optimized to maximize the overall reward and at the same time avoid causing overtraining scenarios that may significantly degrade the system performance.

It should be noted that other scenarios such as random selection of possible reject wait time values, which can be from divided subsets of the possible reject wait time values. This alternative method may achieve fairness among resource utilization and decrease signaling and average per-UE wait time. While this would be better than current approaches, it is not as advantageous as the AI/ML optimization of reject wait time values as described herein.

One or more aspects can be embodied in a network device, such as represented in the example operations of FIG. 7, and for example can include a memory that stores computer executable components and/or operations, and a processor that executes computer executable components and/or operations stored in the memory. Example operations can include operation 702, which represents inputting, to a trained model, measured state data associated with a network environment, the trained model having been trained with collected data from prior base stations and user equipment interaction data associated with a base station and a group of user equipment in the network environment, and the user equipment interaction data comprising information related to radio resource control connection requests by different user equipment of the group of user equipment. Example operation 704 represents obtaining, in response to the inputting of the measured network state data, a rejection wait time for a requesting user equipment requesting a radio resource control connection to the base station, the rejection wait time corresponding to an amount of time the requesting user equipment is to wait before attempting a new radio resource control connection.

The base station can include a centralized unit control plane component, and the measured network state data can include utilization data of the centralized unit control plane component. The utilization data can include a weighted combination of memory utilization and processor utilization.

The base station can include a centralized unit user plane component coupled to the centralized unit control plane component, and the measured network state data can include utilization data of the centralized unit user plane component.

The base station can include a distributed unit component, and wherein the measured network state data can include utilization data of the distributed unit component.

The base station can include a centralized unit control plane component, a centralized unit user plane component, and a distributed unit component, and the measured network state data can include first near-instantaneous utilization data of the centralized unit control plane component, second near-instantaneous utilization data of the centralized unit user plane component, and third near-instantaneous utilization data of the distributed unit component.

The trained model can include a deep reinforcement learning model.

The trained model can determine the rejection wait time by determining a reward value based on a weighted combination of base station load data and user equipment connection-related data that is at least a threshold reward value.

Determining the reward value can include maximizing the reward value based on the weighted combination of base station load data and the user equipment connection-related data; the base station can include a centralized unit control plane component, at least one centralized unit user plane component, and a distributed unit component, and wherein the base station load data can include a combination of first load data of the centralized unit control plane component, second load data of the at least one centralized unit user plane component, and third load data of the distributed unit component.

The user equipment connection-related data can include wait time data of the different user equipment and request rate data of the different user equipment.

The requesting user equipment can correspond to a radio resource control idle state, and the request rate data of the requesting user equipment can include a setup request rate based on a setup request and setup re-request count value, a first time associated with a first rejected radio resource control connection setup request and a second time associated with a radio resource control connection setup request approval.

The requesting user equipment can correspond to a radio resource control inactive state, and wherein the request rate data of the requesting user equipment can include a resume request rate based on a resume request and resume re-request count value, a first time associated with a first rejected radio resource control connection resume request and a second time associated with a radio resource control connection resume request approval.

The user equipment connection-related data can include energy consumption data of the different user equipment with respect to establishing a connection to the base station.

The trained model can determine the rejection wait time by applying a function of a reward based on a weighted combination of at least two of: access point load data, average wait time data of the user equipment, average setup request rate data of the user equipment, average resume request rate data of the user equipment, or average energy consumption data of the user equipment.

One or more example aspects, such as corresponding to example operations of a method, are represented in FIG. 8. Example operation 802 represents obtaining, by a system comprising a processor, measured state data of base station equipment, the state data comprising centralized unit control plane load data, centralized unit user plane load data of a least one centralized unit user plane component, and distributed unit load data. Example operation 804 represents inputting, by the system, the measured state data into a model of the system. Example operation 806 represents obtaining, by the system from the model in response to the inputting of the measured network state data, respective rejection wait times for respective user equipment that are requesting respective radio resource control connections to the base station equipment, the respective rejection wait times corresponding to how much time the respective user equipment are to wait before attempting respective new radio resource control connections. Example operation 808 represents communicating, by the system, the respective rejection wait times to the respective user equipment.

Further operations can include obtaining, by the system, access point data comprising at least one of: base station equipment load data, combined wait time data of the respective user equipment, combined setup request rate data of the respective user equipment, combined resume request rate data of the respective user equipment, or combined energy consumption data of the respective user equipment.

Further operations can include obtaining, by the system, access point data comprising at least one of: base station equipment load data, average wait time data of the respective user equipment, average setup request rate data of the respective user equipment, average resume request rate data of the respective user equipment, or average energy consumption data of the respective user equipment, and communicating, by the system, the access point data to the model.

Figure 9:
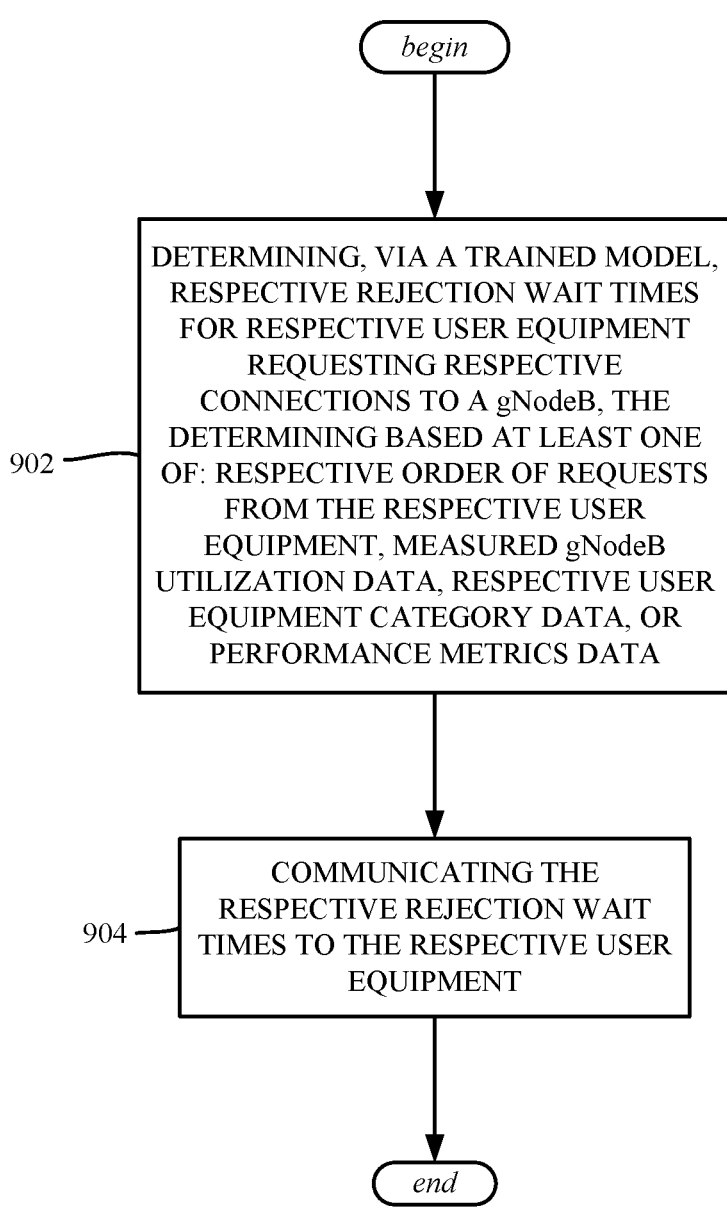
FIG. 9 is a flow diagram showing example operations related to determining respective rejection wait times and communicating the respective rejection wait times to respective user equipment, in accordance with various aspects and implementations of the subject disclosure.

FIG. 9 summarizes various example operations, e.g., corresponding to a machine-readable medium, comprising executable instructions that, when executed by a processor, facilitate performance of operations. Example operation 902 represents determining, via a trained model, respective rejection wait times for respective user equipment requesting respective connections to a gNodeB, the determining based at least one of: respective order of requests from the respective user equipment, measured gNodeB utilization data, respective user equipment category data, or performance metrics data. Example operation 904 represents communicating the respective rejection wait times to the respective user equipment.

Determining the respective rejection wait times can include inputting the measured gNodeB utilization data to the model, the measured gNodeB utilization data comprising centralized unit utilization load data and distributed unit load data during a previous period of time.

Determining the respective rejection wait times can include communicating, from the gNodeB to the model, respective performance metrics data of the respective user equipment; the respective performance metrics data can include respective average wait time data of the respective user equipment, and respective average request rate data of the respective user equipment.

As can be seen, the technology described herein facilitates near-instantaneous optimization of per-UE reject wait times is proposed. A trained wait time prediction model is designed through the utilization of AI/ML DRL and used to perform the optimization. The technology described herein decreases the overall RRC connection request rate, while maintaining high utilization of gNB resources. This results in increased per-UE energy efficiency and decreased signaling traffic loads.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
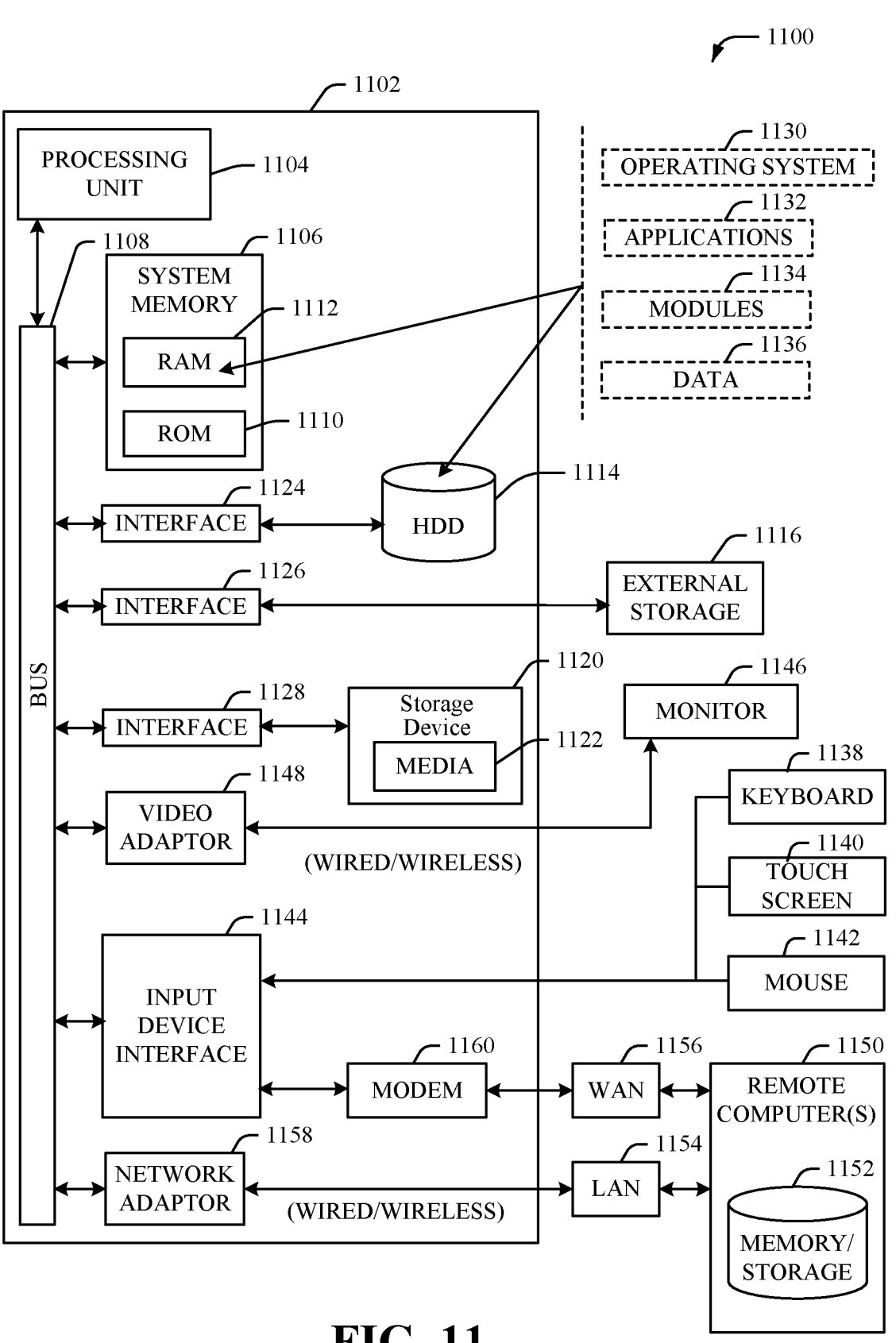
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
at least one processor; and
at least one memory that stores executable instructions that, when executed by the at least one processor, facilitate performance of operations, the operations comprising:
   inputting, to an artificial intelligence model, measured network state data associated with a network environment, the artificial intelligence model having been trained with collected data from prior base stations and user equipment interaction data associated with a base station and a group of user equipment in the network environment, and the user equipment interaction data comprising information related to radio resource control connection requests by different user equipment of the group of user equipment; and
   obtaining from the artificial intelligence model, in response to the inputting of the measured network state data, a rejection wait time for a requesting user equipment requesting a radio resource control connection to the base station, the rejection wait time corresponding to an amount of time the requesting user equipment is to wait before attempting a new radio resource control connection, wherein the artificial intelligence model determines the rejection wait time by maximizing a reward value based on a weighted combination of base station load data and user equipment connection-related data that is at least a threshold reward value, wherein the base station comprises a centralized unit control plane component, at least one centralized unit user plane component, and a distributed unit component, and wherein the base station load data comprises a combination of first load data of the centralized unit control plane component, second load data of the at least one centralized unit user plane component, and third load data of the distributed unit component.

2. The system of claim 1, wherein the measured network state data comprises utilization data of the centralized unit control plane component.

3. The system of claim 2, wherein the weighted combination is a first weighted combination, and wherein the utilization data comprises a second weighted combination of memory utilization and processor utilization.

4. The system of claim 1, wherein a centralized unit user plane component of the at least one centralized unit user plane component is coupled to the centralized unit control plane component, and wherein the measured network state data comprises utilization data of the centralized unit user plane component.

5. The system of claim 1, wherein the measured network state data comprises utilization data of the distributed unit component.

6. The system of claim 1, wherein the measured network state data comprises first near-instantaneous utilization data of the centralized unit control plane component, second near-instantaneous utilization data of a centralized unit user plane component of the at least one centralized unit user plane component, and third near-instantaneous utilization data of the distributed unit component.

7. The system of claim 1, wherein the artificial intelligence model comprises a deep reinforcement learning model.

8. The system of claim 1, wherein the user equipment connection-related data comprises wait time data of the different user equipment and request rate data of the different user equipment.

9. The system of claim 8, wherein the requesting user equipment corresponds to a radio resource control idle state, and wherein the request rate data of the requesting user equipment comprises a setup request rate based on a setup request and setup re-request count value, a first time associated with a first rejected radio resource control connection setup request and a second time associated with a radio resource control connection setup request approval.

10. The system of claim 8, wherein the requesting user equipment corresponds to a radio resource control inactive state, and wherein the request rate data of the requesting user equipment comprises a resume request rate based on a resume request and resume re-request count value, a first time associated with a first rejected radio resource control connection resume request and a second time associated with a radio resource control connection resume request approval.

11. The system of claim 1, wherein the user equipment connection-related data comprises energy consumption data of the different user equipment with respect to establishing a connection to the base station.

12. The system of claim 1, wherein the weighted combination is based further on at least two of: access point load data, average wait time data of the group of user equipment, average setup request rate data of the group of user equipment, average resume request rate data of the group of user equipment, or average energy consumption data of the group of user equipment.

13. A method, comprising:
   inputting, by a system comprising at least one processor, to an artificial intelligence model, measured network state data associated with a network environment, the artificial intelligence model having been trained with collected data from prior base stations and user equipment interaction data associated with a base station and a group of user equipment in the network environment, and the user equipment interaction data comprising information related to radio resource control connection requests by different user equipment of the group of user equipment; and
   obtaining, by the system, from the artificial intelligence model, in response to the inputting of the measured network state data, a rejection wait time for a requesting user equipment requesting a radio resource control connection to the base station, the rejection wait time corresponding to an amount of time the requesting user equipment is to wait before attempting a new radio resource control connection, wherein the artificial intelligence model determines the rejection wait time by maximizing a reward value based on a weighted combination of base station load data and user equipment connection-related data that is at least a threshold reward value, wherein the base station comprises a centralized unit control plane component, at least one centralized unit user plane component, and a distributed unit component, and wherein the base station load data comprises a combination of first load data of the centralized unit control plane component, second load data of the at least one centralized unit user plane component, and third load data of the distributed unit component.

14. The method of claim 11, wherein the user equipment connection-related data comprises wait time data of the different user equipment and request rate data of the different user equipment.

15. The method of claim 14, wherein the requesting user equipment corresponds to a radio resource control idle state, and wherein the request rate data of the requesting user equipment comprises a setup request rate based on a setup request and setup re-request count value, a first time associated with a first rejected radio resource control connection setup request and a second time associated with a radio resource control connection setup request approval.

16. The method of claim 14, wherein the requesting user equipment corresponds to a radio resource control inactive state, and wherein the request rate data of the requesting user equipment comprises a resume request rate based on a resume request and resume re-request count value, a first time associated with a first rejected radio resource control connection resume request and a second time associated with a radio resource control connection resume request approval.

17. A non-transitory machine-readable medium, comprising executable instructions that, when executed by at least one processor, facilitate performance of operations, the operations comprising:

inputting, to an artificial intelligence model, measured network state data associated with a network environment, the artificial intelligence model having been trained with collected data from prior base stations and user equipment interaction data associated with a base station and a group of user equipment in the network environment, and the user equipment interaction data comprising information related to radio resource control connection requests by different user equipment of the group of user equipment; and obtaining, from the artificial intelligence model, in response to the inputting of the measured network state data, a rejection wait time for a requesting user equipment requesting a radio resource control connection to the base station, the rejection wait time corresponding to an amount of time the requesting user equipment is to wait before attempting a new radio resource control connection, wherein the artificial intelligence model determines the rejection wait time by maximizing a reward value based on a weighted combination of base station load data and user equipment connection-related data that is at least a threshold reward value, wherein the base station comprises a centralized unit control plane component, at least one centralized unit user plane component, and a distributed unit component, and wherein the base station load data comprises a combination of first load data of the centralized unit control plane component, second load data of the at least one centralized unit user plane component, and third load data of the distributed unit component.

18. The non-transitory machine-readable medium of claim 17, wherein the user equipment connection-related data comprises wait time data of the different user equipment and request rate data of the different user equipment.

19. The non-transitory machine-readable medium of claim 18, wherein the requesting user equipment corresponds to a radio resource control idle state, and wherein the request rate data of the requesting user equipment comprises a setup request rate based on a setup request and setup re-request count value, a first time associated with a first rejected radio resource control connection setup request and a second time associated with a radio resource control connection setup request approval.

20. The non-transitory machine-readable medium of claim 18, wherein the requesting user equipment corresponds to a radio resource control inactive state, and wherein the request rate data of the requesting user equipment comprises a resume request rate based on a resume request and resume re-request count value, a first time associated with a first rejected radio resource control connection resume request and a second time associated with a radio resource control connection resume request approval.

* * * * *